F. RASCHIG.
ABSORPTION AND REACTION TOWER FOR ACIDS, &c.
APPLICATION FILED MAY 26, 1914.
1,141,266.
Patented June 1, 1915.
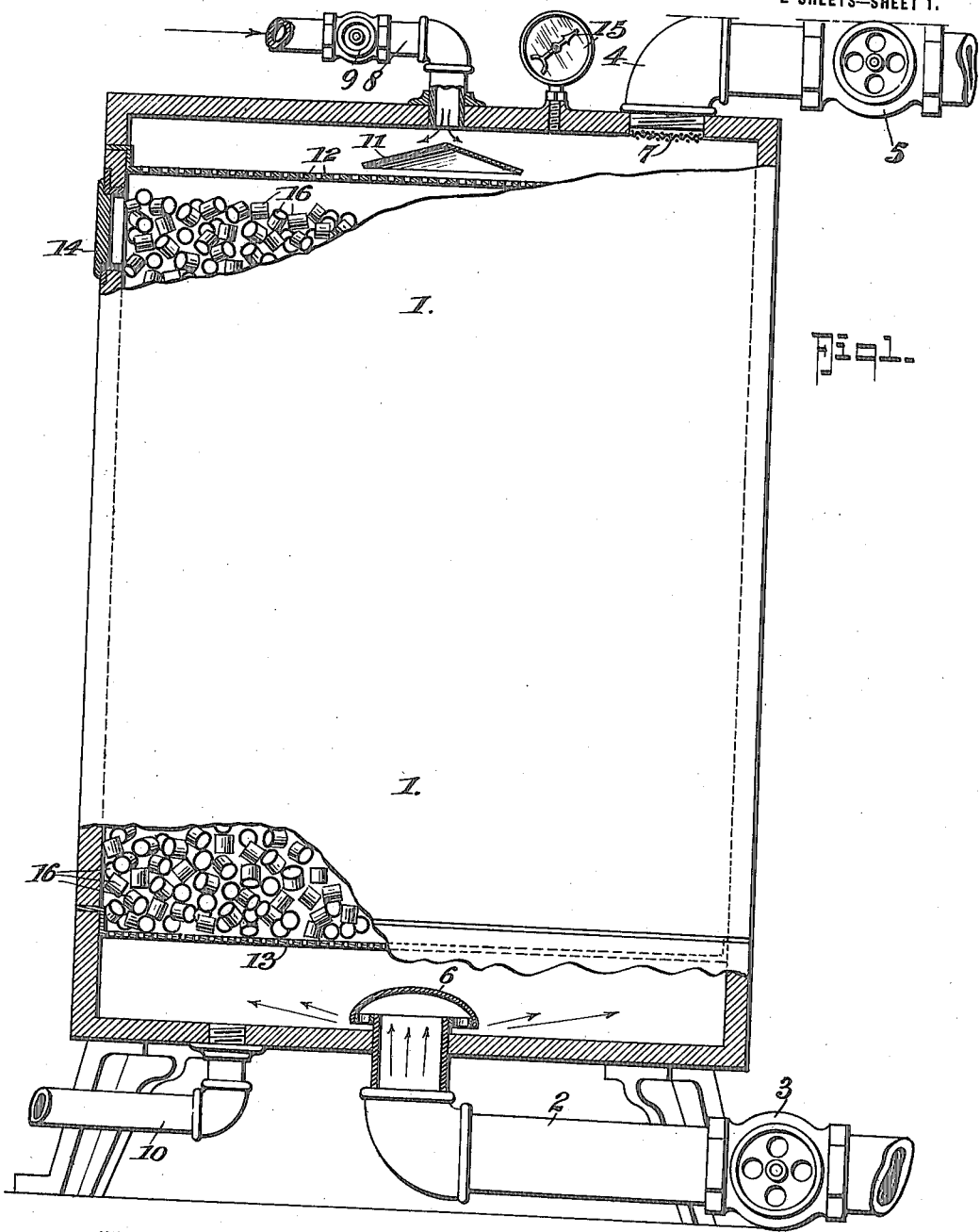
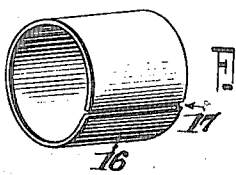

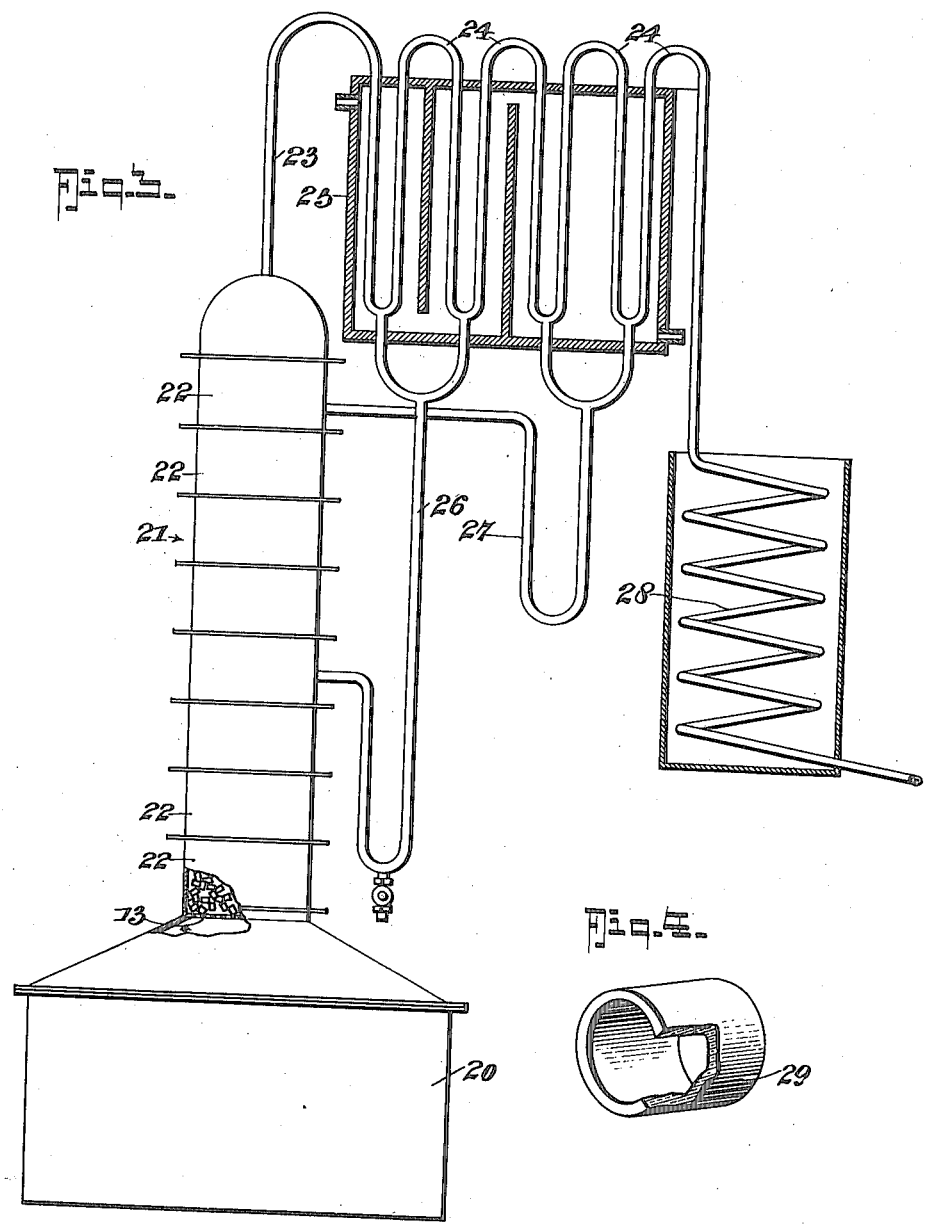

UNITED STATES PATENT OFFICE.

FRITZ RASCHIG, OF LUDWIGSHAFEN-ON-THE-RHINE, GERMANY.

ABSORPTION AND REACTION TOWER FOR ACIDS, &c.

1,141,266.   Specification of Letters Patent.   Patented June 1, 1915.

Application filed May 26, 1914. Serial No. 841,174.

*To all whom it may concern:*

Be it known that I, FRITZ RASCHIG, doctor of philosophy, chemist, a citizen of the German Empire, residing at Ludwigshafen-on-the-Rhine, Germany, have invented new and useful Improvements in Absorption and Reaction Towers for Acids, &c., of which the following is a specification.

This invention relates to towers, such as acid absorption or reaction towers for absorbing gases in liquids, for treating and purifying gases with liquids, for effecting reactions between liquids and gases, for fractionating or rectifying liquids, and for other purposes; and it comprises such a tower filled with cylinders of metal, glass, earthenware, impregnated wood or paper, etc., such cylinders being of a relatively small size, *e. g.*, one inch in diameter and height, and being thrown into the tower in an irregular manner and arranged promiscuously therein; it further comprises such a tower provided with suitable gas and liquid inlets and outlets, etc., as well as a distillation or fractionation or rectification tower, provided with means for supplying thereto the liquid to be rectified or fractionated and for removing therefrom the resulting gaseous or liquid constituents or fractions; and it also comprises certain novel features of construction and arrangements of parts; all as more fully hereinafter set forth and as claimed.

In the construction of towers for treating liquids with gases, or vice versa, various constructions of baffles and checkerwork have been used for spreading out the liquids and causing the liquids and gases to take a circuitous passage and for prolonging their contact with each other. The Guttmann metal balls (German Patent 197,318) and the similar hollow clay balls (German Patent 91,815) have, to a large extent, replaced all other fillings in such absorption and reaction towers. Such hollow balls, however, have certain disadvantages. They are difficult and expensive to construct and the resistance which they offer to the passage of gases through the tower requires a larger inlet pressure of the gases or a larger difference of pressure between the inlet and outlet than is readily obtainable with many suction or pressure producing gas fans or ventilators. The bulk of these hollow balls reduces the effective reaction volume and area of the tower, while the collection of liquid inside thereof which soon becomes saturated or otherwise inactive prevents the free action of liquid and gas or vapor that would otherwise be secured, and decreases the effective surface presented to the rising gas and descending liquid.

Over such towers of the old art the tower of the present invention presents many advantages, while by its use the above referred to disadvantages are minimized or obviated. The apparatus of the present invention is moreover capable of wide application, is simple and inexpensive in construction, and enables reactions between gases or vapors and liquids to be effected without pocketing of the liquid or gas, and with a minimum loss in pressure of the gas passing through the apparatus. When used as a distillation or rectifying apparatus it presents similar advantages of offering but little resistance to the ascending vapors and little loss of pressure throughout the whole apparatus.

I will now proceed to describe my invention more in detail in connection with the embodiments thereof, illustrated somewhat diagrammatically on the accompanying drawings, it being intended and understood that the invention, which is of wide and general application, is illustrated by, but not limited to the embodiments thereof so illustrated and described.

In these drawings, Figure 1, shows in elevation, with parts broken away to disclose the interior construction, a reaction or absorption tower embodying the present invention; Fig. 2, is an enlarged view of one of the sheet metal cylinders used in such apparatus; Fig. 3, is an elevation of a fractionating or rectifying apparatus embodying the present invention; and Fig. 4, is a view of a modified form of cylinder.

In these drawings it will be understood that the apparatus is shown somewhat diagrammatically, and that the specific construction of the towers can be widely varied.

The apparatus of the present invention comprises essentially a reaction or absorption or distillation tower filled with small cylinders of uniform or substantially uniform size and arranged irregularly or promiscuously or indiscriminately therein, said tower being provided with suitable liquid and gas or vapor inlets and outlets in the case of gas treating towers, or with suitable inlets and outlets for the liquid and vapor in the case of distillation or rectification towers.

In the apparatus illustrated somewhat diagrammatically in Fig. 1, the tower 1 is provided at its bottom with a gas inlet pipe 2, provided with a suitable cut-off and regulating valve 3, and with a gas outlet pipe 4, provided with a similar valve 5. The gas inlet pipe may extend above the bottom of the tower, as shown, and may be provided with a cap 6 for preventing inflow of liquid. The gas outlet pipe may similarly be provided with a screen 7, although such screen may not be necessary and may be dispensed with. At the top of the apparatus is a suitable liquid supply pipe 8, having a control valve 9, and at the bottom is a liquid outlet pipe 10, which may similarly be provided with a control valve (not shown). The construction and arrangement of these liquid and gas inlet and outlet pipes and connections can be widely varied. A suitable deflector 11 is shown at the top of the apparatus for deflecting the incoming liquid, and a perforated distributing plate 12 is arranged to secure a distribution of the liquid passing therethrough. Above the bottom wall of the tower is a supporting partition or diaphragm 13 for supporting the filling thereabove and permitting upflow of gases and downflow of liquid therethrough. Supported on this partition 13 are the cylinders 16 which will be hereinafter more fully described; said cylinders being charged into the tower by any suitable means, e. g., the charging door 14. A suitable pressure gage 15 may be arranged at the top of the tower or at any other suitable location for indicating the pressure therein.

In the apparatus of Fig. 3 is shown a fractionating tower 21 arranged above a suitable distillation chamber or receptacle 20; this tower 21 being shown as made up of superposed sections 22 from the top of which leads an outlet pipe 23 connecting with U-tubes 24, surrounded by a suitable water or air bath 25, maintained at any desired temperature. From the bottom of said U-tubes return pipes 26 and 27 lead to the tower at different levels for returning to the tower any condensate formed in these tubes. The gases or vapors escaping from these tubes pass through the condenser coil 28 into any suitable receptacle. Inside the tower 21, and above the supporting partition 13 are arranged cylinders which are similar to those shown in Figs. 2 and 4, and which will be described in greater detail hereinafter. It will be understood that the distilling apparatus, as well as the condensing apparatus, of Fig. 3 can be widely varied; this figure being intended to illustrate one embodiment of the apparatus of the present invention, by which the invention and its operation can be the more clearly understood.

Within the reaction or absorption of distillation tower of the present invention are arranged small cylinders of uniform or substantially uniform size. The exact size of these cylinders can be varied but for many purposes a size of e. g., about one inch in diameter and one inch in length gives excellent results. These cylinders are thrown into the tower and permitted to arrange themselves indiscriminately or promiscuously therein. By making these cylinders of uniform size it is impossible for them to telescope together or fit one inside of another, but they arrange themselves with only point or line contact with each other and with their axes either horizontal or inclined and with the axes and surfaces of adjacent cylinders at various angles and inclinations with each other. Since any appreciable surface contact of these cylinders with each other is impossible, and since each cylinder presents a practically unobstructed passage therethrough, it results that pocketing of the liquid is minimized or entirely avoided while the various inclinations and arrangements of the adjacent cylinders are such as to cause the ascending gases or vapors and the descending liquid to pass in a most varied course through the tower, the course being a zig-zag or multi-varied course with frequent interruptions and changes in direction. A most intimate and promiscuous intermixing and intermingling of the ascending gases and vapors and the descending liquid is thus effected. Moreover, the absence of pockets of liquid or vapor prevents any appreciable increase in resistance on this account, while the large surface presented by the cylinders gives a most intimate and prolonged intermixture of liquid and gas. The action of the gas or vapor and the liquid on each other is uniform and regular throughout the apparatus, local unevennesses being avoided, in spite of the multi-varied course of the liquid and gas.

The cylinders used in the apparatus of the present invention can be made in different sizes and of different materials. Where non-reactive gases and liquids are treated and the liquid and gas are not corrosive, the cylinders may be made of metal, e. g., sheet iron bent into the shape of cylinders, of tin plate, tin, lead, copper, nickel, or alloys of these metals, etc. Where corrosive liquids or gases are used the cylinders may be made of glass, clay, porcelain, etc. They may also be made of suitably impregnated wood, paper, cardboard, paper pulp, cement, etc., such materials being suitably compounded and waterproofed where a waterproof cylinder is desired, or being coated on the outside with a suitable waterproof or other coating. The material selected will be one not injuriously affected by the reagents used, and not itself injuriously affecting the desired reaction. These cylinders may moreover be made of clay or other material which will beneficially affect or promote the reaction. Thus asbestos cylinders may be impregnated with a suitable catalytic, e. g., nickel oxid, etc., or the catalytic can be compounded with the asbestos or other material before the cylinders are made or the metal cylinders may be suitably coated with a catalytic composition, or wood or paper cylinders similarly coated, etc. In Fig. 2 is shown a metal cylinder 16 made by bending sheet metal, the edges of the sheet being indicated at 17. In Fig. 4 is shown a cast cylinder, e. g., of glass or porcelain.

The size of the cylinders can be varied for different purposes and for different dimensions and arrangements of apparatus. For many purposes a cylinder of approximately 2½ cm. or 1 inch in height and diameter gives excellent results. As an illustration of the active surface presented by a tower filled with such cylinders it may be mentioned that a tower of one cubic meter in volume, filled with cylinders of the size indicated presents a surface of about 300 square meters; while the resistance offered and the decrease in effective volume is so small that in a tower ten meters in height and one square meter in section 500 cubic meters of gas can be blown per hour with a difference or loss in pressure of only about 2 mm. as indicated by a water gage. The addition of two cubic meters of liquid causes a further increase in pressure of only about 1 mm.

The apparatus of the present invention is of wide and general application, as has been already pointed out. Thus, illuminating— or coke oven—or other gas, while still in a highly heated condition, can be freed from fine tar particles and easily condensable constituents in the form of thin tar or pitch. Blast furnace gases or other dust laden gases can be washed or freed from dust, and thereby made available for heating or power purposes, by passing them up through such a tower as that of Fig. 1, filled with cylinders over which water is allowed to run. Water soluble gases may be separated from water insoluble gases, and gases soluble in various saline or organic solvents can be separated from gases insoluble in such solvents by passing the gases in a similar manner up through the tower filled with cylinders over which the liquid is descending. Hydrochloric acid gas or sulfur dioxid, nitrous oxid, ammonia, etc., can thus be absorbed and removed from air containing them. Similarly carbon dioxid can be absorbed and air containing it can be purified by absorption in a suitable carbonate solution such as sodium or potassium carbonate. Bicarbonates can thus be prepared from flue or furnace gases, and the carbonate and pure carbon dioxid recovered by decomposition. Precipitated chalk of superior qualities can be made by treatment of a solution of lime with carbon-dioxid-containing gases. Condensed water from steam boilers can be cooled by passing through the apparatus together with a counter-current of air, the air being at the same time purified and moistened. The cooling effect in this case is due in part to evaporation and in part to contact with the cooler air, the intimacy of contact of the air and water, and the large surface of liquid presented, causing a very considerable evaporation with accompanying lowering of temperature.

In such processes as those above described it will be understood that the liquid and gas or vapor meet each other counter-currently, and that suitable means (not shown) are provided for supplying, removing and controlling the liquid and gas, and maintaining the desired flow. The apparatus can be operated under a vacuum or under a pressure above atmospheric by suitable suction or pressure producing means. Where a pressure substantially atmospheric is maintained the draft may be produced by a chimney or ventilator or by a fan or blower or in other suitable manner.

In the operation of the apparatus for fractional distillation the distilled gaseous or vapor mixture is allowed to ascend through the tower under such conditions that a portion thereof is condensed and the rising vapors meet and intermingle with the descending condensate. Thus in the apparatus illustrated diagrammatically in Fig. 3 the liquid distilled in the lower distillation vessel rises through the tower and is in part condensed, the rising vapors and liquid undergoing fractionation and rectification. The vapors condensed in the U-tubes are also returned to the tower, as will be understood without further description, it being also understood that the temperature conditions can be maintained and varied as desired. In this manner fractional distillation of all kinds of liquids can be effected, for example, of tar oil, petroleum, benzene, alcohol, phenol, cresol, toluene, nitrobenzol, nitrotoluol, anilin, methylanilin, dimethyl-, ethyl-, diethyl-, benzyl-, dibenzyl-anilin, etc., diphenylamin, naphthylamin, etc. as well as mixtures of the above and other liquids, etc. The intimate contact of the liquid and vapor causes the desired fractionation to take place in a particularly advantageous manner.

Whatever the use of the apparatus or the nature of the gases or liquids treated may be, it will be seen that a most intimate reaction and intermingling is effected; that a large surface for the reaction and for distributing the liquid as a film is presented;

that pocketing of the liquid or local unevennesses is avoided; and that only a minimum portion of the tower is occupied by the material of the cylinders, through which the liquid and gas freely pass with a minimum of resistance. The advantages are the same in catalytic and other chemical reaction processes as in mechanical washing or purifying processes. Moreover, each specific process may have its own particular advantages when carried out in the apparatus of the present invention. Thus in catalytic processes where the catalytic agent is carried by or is incorporated in the cylinders and where liquids, such as oils or fats, are to be treated with gases, such as hydrogen, we have the great advantages of intimacy of intermixture of the liquid and gas, and the exposure of the oil or fat in film form to the catalytic.

The apparatus of the present invention can moreover be used for carrying out reactions between liquid mixtures or between gaseous mixtures either at ordinary or at elevated temperatures. Thus chlorination processes can be carried out by passing mixtures of chlorin and other liquid or gas, e. g., methane, acetylene, etc., through the apparatus at suitable temperatures and pressures, the multivaried course of the reacting gases causing most intimate intermixture. The reactions may moreover be promoted by the use of suitable catalytics, e. g., incorporated in the cylinders or applied to their interior and exterior. Thus in the catalytic processes of hydrogenation by the use of high temperatures and pressures the mixture of hydrogen and other gas or vapor can be passed through the reaction tower which can be suitably heated (by means not shown) to maintain the desired temperature. In the case of such catalytic processes the catalytic can be applied to or incorporated in or on the cylinders or otherwise applied to the reacting mixtures.

From the foregoing description it will be seen that the invention is capable of general application, and that variations and modifications of the specific embodiments thereof, as illustrated and described may be made without departing from the spirit and scope as set forth in the accompanying claims.

I claim:

1. An absorption and reaction apparatus comprising a tower charged with small cylinders of substantially uniform size arranged in a promiscuous manner.

2. An absorption and reaction apparatus comprising a tower charged with small sheet metal cylinders of substantially uniform size arranged in a promiscuous manner.

3. An absorption and reaction apparatus described comprising a tower charged with small cylinders of substantially uniform size arranged in a promiscuous manner, and said tower being provided near its upper end with means for supplying liquid thereto and removing gases therefrom, and at its lower end with means for supplying gases thereto and removing liquid therefrom.

4. An absorption and reaction apparatus comprising a tower charged with small cylinders of substantially uniform size arranged in a promiscuous manner, said tower being provided with means for supplying reacting fluids thereto and for removing the products of reaction therefrom.

5. An absorption and reaction apparatus comprising a tower charged with small catalytic-carrying cylinders of substantially uniform size arranged in a promiscuous manner.

6. An absorption and reaction apparatus described comprising a tower charged with small sheet metal catalytic-carrying cylinders of substantially uniform size arranged in a promiscuous manner.

7. An absorption and reaction apparatus comprising a tower charged with small cylinders about one inch in diameter irregularly arranged.

8. An absorption and reaction apparatus comprising a tower charged with small sheet metal cylinders about one inch in diameter irregularly arranged.

In testimony whereof, I have hereunto set my hand in the presence of two subscribing witnesses.

FRITZ RASCHIG.

Witnesses:
J. DEUSCHEL,
S. S. BERGER.